Patented Aug. 27, 1935

2,012,347

UNITED STATES PATENT OFFICE 2,012,347

OLEFINE-POLYSULPHIDE PLASTIC AND THE MANUFACTURE THEREOF

Joseph C. Patrick, Kansas City, Mo.

No Drawing. Application August 8, 1930, Serial No. 474,066

10 Claims. (Cl. 260—6)

The present invention relates to improvements in high sulphur plastics containing sulphur combined with olefine radicals, for example, of the type described in my prior application Serial No. 239,808, filed December 13, 1927, and in my application Serial No. 474,299, filed August 9, 1930. Such plastics may be produced by the reaction of soluble polysulphides upon reactive olefine compounds, such as reactive methylene bodies, olefine dihalides, and the like, as set forth in my applications above referred to.

In accordance with the present application, I incorporate in the plastic material, preferably in the process of formation thereof, a protective colloid, preferably a protein-type body in colloidal dispersion, it being probable that the colloidal or protein-type material forms a skeleton or lattice throughout the colloid mass.

In preparing the improved plastic material in accordance with this invention, I prefer to produce the olefine polysulphide plastic in dispersed form, as a suspension or latex, incorporating the colloid material into the dispersion during or after its formation, and subsequently coagulating or precipitating the olefine polysulphide plastic from the dispersion, accompanied by the colloid material. In order to produce the olefine polysulphide plastic in dispersed form, I may incorporate into the reaction mixture of polysulphide and reactive olefine compound a finely divided insoluble basic compound of a metal of the alkaline earth group, such as hydroxides of calcium, barium or magnesium, their oxides (where such may be employed), carbonates or the like, as set forth in my prior applications 369,912, filed June 12, 1929 and 393,830, filed September 19, 1929. The selected protective colloid, suitably a protein-type body, is incorporated into the resulting dispersion or into the reaction mixture during or prior to reaction. In the subsequent washing and precipitation of the plastic material, the colloid so added is carried with the plastic, and materially modifies the characteristics of the dispersion and of the finished plastic material, as more fully hereinafter set forth.

In order that the invention may be fully understood, I set forth hereinafter a specific embodiment thereof, it being understood, however, that the details thus set forth are not intended to limit the scope of the invention.

A polysulphide solution is prepared of a soluble polysulphide, the rank of the polysulphide employed being determined in accordance with the proportion of sulphur and the physical characteristics desired in the final product. Any soluble polysulphide may be employed, such as the polysulphides of sodium, potassium, barium, strontium, calcium, ammonium, or polysulphides of organic bases such as triethanolamine, the particular polysulphide employed being immaterial, since the metal or metallic equivalent is eliminated in the reaction. For economic reasons I prefer to employ the sodium polysulphides. The proportion of sulphur in the polysulphide may vary, say from two times that present in the corresponding simple sulphide to the maximum obtainable, which is ordinarily about $S_5$. As pointed out in my prior applications hereinbefore referred to, as the rank of the polysulphide increases, the physical characteristics of the resulting product changes, becoming softer. The polysulphide solution may be employed as produced, but preferably is stabilized by heating after being produced. In the present specific example, the polysulphide employed is one having an empirical formula $Na_2S_{4.5}$.

A solution of such a polysulphide, suitably about 1300 parts by weight and containing about 267.5 parts of polysulphide sulphur, is employed, and is caused to react with approximately the theoretical equivalent proportion of the reactive olefine body; in the case of ethylene dichloride, about 184.2 parts by weight. This reaction is caused to take place in the presence of the dispersing agent, suitably freshly precipitated magnesium hydroxide and of the protective colloid material, such as egg-albumen. The reaction mixture may be prepared and the reaction carried out in the following manner.

To the above amount of polysulphide solution, there is added about 1 part by weight of commercial dried egg-albumen, previously dispersed in about 25 parts of warm water, and 15 parts by weight of crystalline magnesium chloride, previously dissolved in about 50 parts of hot water. Although not necessary, I have found it desirable to add a small amount of additional alkali, for example, about 6 parts by weight of caustic soda dissolved previously in about 50 parts by weight of water.

The reaction mixture is then heated in a suitable retort, preferably under a reflux condenser, and the ethylene dichloride added, a small amount at a time to avoid violent refluxing. A suitable temperature for the reaction mixture is about 100 to 110° F., although the temperature may be varied within quite wide limits, particularly if pressure is applied during the reaction to prevent excessive vaporization. The reaction is completed in one to one and one-half hours, and the reaction mixture may then be further heated for a short period to a temperature slightly below boiling, say 190 to 195° F., by steam heating, for example. The reaction product is formed in the reaction mixture as a dispersion, the reaction mixture having the appearance of a yellowish, creamy liquid or latex. This latex is then washed, to remove water soluble salts, suitably by dilution and decantation. For example, the reaction mixture may be poured into a container of suitable size, in which it is diluted with about an equal volume of water. It is then allowed to settle, the clear liquid resting above the settled thicker latex drawn off, the latex again mixed with water and the operation repeated until the desired purity and freedom from soluble compounds is secured.

The purified latex may then be coagulated. It is found, however, that the conduct of the latex containing the protective colloid toward coagulating agents is materially different from that of the latex obtained without their presence, as described, for example, in my prior application 393,830, above referred to. On acidulation of the latex of the present invention with dilute acid, such as hydrochloric or sulphuric acid or the like, until a faint permanent acidity is shown, for example, with methyl orange indicator, coagulation is not effected. The acidified latex is then washed by decantation by a procedure similar to that above described and the product is then flocculated by the addition of a dilute alkaline solution such as sodium or potassium hydroxide, or preferably ammonium hydroxide, until the liquid becomes distinctly alkaline. The particles of the reaction product then flocculate and agglomerate, the resulting coagula settling quite rapidly and may be further washed to remove water soluble impurities as far as possible. The coagula may then be separated from the liquid by filtration or centrifuging, pressed to remove as much water as possible and then air dried or dried by milling on warm rolls or by any other suitable means.

In carrying out the operation in accordance with the present invention, as pointed out hereinbefore, I may employ any soluble polysulphide, of a rank determined by the character of the final product desired. Instead of magnesium hydroxide, as set forth in the preceding example, I may employ other insoluble basic compounds of alkaline earth metals, such as a suspension of milk of lime, or the hydroxides of strontium or barium, or the carbonates of calcium, strontium or barium or magnesium. The proportion of the insoluble basic compound employed may be varied within wide limits; for example, in the above example, from 2 to 50 parts by weight of the insoluble basic compound may be present.

The colloid material employed is preferably a proteid material, such as glue, casein, egg-albumen, blood albumen, gelatin or the like, although other protective colloids, such as hydrolyzed starch, gums, dextrins, saponins, or the like may be employed. In general, water-peptizable organic colloids may be employed, but I have found the best results to be secured with those of the protein type. The proportion of the colloid employed is in general quite small, being ordinarily less than 1%. In the specific example given above, it is approximately 0.30% on the final product, but may vary from 0.1 to about 5% of the olefine-polysulphide plastic.

Although in the example above set forth, the water-peptizable colloid has been added to the reaction mixture before reaction, it may be incorporated therein during reaction or after reaction has been completed. Ordinarily, it is not desirable to add it during reaction, as there may be some deleterious action from the heat of the reaction mixture upon the colloid before it is completely dispersed throughout the mixture. I prefer to add the colloid to the reaction mixture before reaction begins.

The reactive organic substance used may be a suitable methylene compound, such as formaldehyde, hexamethylenetetramine or one of the dihalides of methylene, or it may be one of the dihalides of such olefines as ethylene, propylene, butylene, or amylene.

I prefer to employ ethylene dichloride by reason of its cheapness and availability and convenience in reaction. With lower homologue, the reaction must be conducted at lower temperatures and, with corresponding polysulphides, the resulting product will contain higher proportions of sulphur. Thus, for example, if a methylene body such as methylene dichloride is employed in the reaction, the resulting product will resemble physically the product prepared with ethylene dichloride, but will contain a higher proportion of sulphur; for example, with a polysulphide such as that employed in the specific example above, the ethylene product will contain about 83% sulphur whereas the corresponding methylene product will contain about 90% sulphur. The corresponding products prepared with the higher homologues require longer for completion of reaction, yield a softer product and the products contain lower proportions of sulphur. For example, the corresponding product produced with butylene dichloride will contain about 70–71% sulphur and that obtained with a propylene dihalide will contain about 76% sulphur. Where the reaction is carried out with other polysulphides of different rank, the corresponding relationship between the resulting products will obtain.

The coagulated reaction product prepared in accordance with the present invention and containing the dispersed colloid has excellent tensile properties and may be milled on a rubber mill, suitably with various compounding ingredients, such as zinc oxide, carbon black, litharge, stearic acid, clay, etc., to produce a raw compound which is plastic or "tacky", but which on heating to an elevated temperature, say 212 to 300° F., either by steam or hot water under pressure, loses its "tackiness" and plasticity and yields a resilient, tough, elastic substance which has a high tensile strength and is unaffected by acids, alkalies, oxygen, or ozone and has high heat insulating and dielectric qualities. It is substantially insoluble in oils and organic solvents generally. By taking advantage of its plasticity and tackiness before curing, it may be shaped or molded to any suitable form, or may be extruded to form tubes or as an insulating covering upon electrical conductors or may be applied by presses or rolling mills to the surfaces of fabrics, such as cotton, duck, woven asbestos or the like to form a protective coating thereon, the resulting article being subsequently heated to cure the plastic compound as hereinbefore set forth.

I claim:
1. The method of producing a plastic which comprises reacting upon an olefine dihalide with a solution of a water soluble polysulphide in the presence of an insoluble basic compound of an alkaline earth metal and of a water-peptizable protein, thereby forming a dispersion of an olefine-polysulphide plastic containing the water-peptizable colloid.

2. The method of producing a plastic which comprises reacting upon an olefine dihalide with an aqueous solution of a soluble polysulphide in the presence of finely divided magnesium hydroxide and a water-peptizable protein, thereby forming a latex containing dispersed olefine-polysulphide in the presence of the water-peptizable protein.

3. An aqueous dispersion of olefine-polysulphide produced by the reaction of a soluble polysulphide upon a methylene compound of the group consisting of methylene dihalide, formaldehyde, hexamethylenetetramine, and olefine dihalides in the presence of a dispersing agent, said dispersion containing a protective colloid.

4. An aqueous dispersion of an olefine-polysulphide produced by the reaction of a soluble polysulphide upon a methylene compound of the group consisting of methylene dihalide, formaldehyde, hexamethylenetetramine, and olefine dihalides in the presence of a dispersing agent, said dispersion containing a water-peptizable protein.

5. An aqueous dispersion of an olefine-polysulphide plastic produced by the reaction of a soluble polysulphide upon a methylene compound of the group consisting of methylene dihalide, formaldehyde, hexamethylenetetramine, and olefine dihalides in the presence of a dispersing agent, said dispersion containing peptized albumen, and being characterized in that it is not coagulated when brought to slightly acid state.

6. A latex comprising an aqueous dispersion of an ethylene polysulfide plastic produced by the reaction of a soluble polysulphide upon a methylene compound of the group consisting of methylene dihalide, formaldehyde, hexamethylenetetramine, and olefine dihalides in the presence of a dispersing agent, said dispersion containing peptized albumen.

7. A plastic product containing, as a plastic constituent, an olefine polysulphide plastic produced by the reaction of a soluble polysulphide upon a methylene compound of the group consisting of methylene dihalide, formaldehyde, hexamethylenetetramine, and olefine dihalides in the presence of a dispersing agent, said dispersion having a water-peptizable protein dispersed therethrough.

8. A plastic material comprising an olefine-polysulphide plastic produced by the reaction of a soluble polysulphide upon a methylene compound of the group consisting of methylene dihalide, formaldehyde, hexamethylenetetramine, and olefine dihalides in the presence of a dispersing agent, said plastic material having a water-peptizable protein dispersed therethrough, in the proportion of 0.1 to 5% of the olefine-polysulphide plastic.

9. The method of producing a plastic which comprises reacting upon a methylene compound of the group consisting of methylene dihalide, formaldehyde, hexamethylenetetramine, and olefine dihalides with a solution of a water soluble polysulphide in the presence of a dispersing agent for the reaction product and a protective colloid, thereby forming a dispersion of said organic substance-polysulphide plastic containing such protective colloid.

10. The method of producing a plastic, which comprises reacting upon a methylene compound of the group consisting of methylene dihalide, formaldehyde, hexamethylenetetramine and olefine dihalides with a solution of a water soluble polysulphide in the presence of an insoluble basic compound of a metal of alkaline earth group and a protective colloid, thereby forming a dispersion of an olefine polysulphide plastic containing such protective colloid.

JOSEPH C. PATRICK.